United States Patent
Iijima

(10) Patent No.: US 10,203,201 B2
(45) Date of Patent: Feb. 12, 2019

(54) MEASUREMENT DEVICE

(71) Applicant: FANUC CORPORATION, Minamitsuru-gun, Yamanashi (JP)

(72) Inventor: Kazunori Iijima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/918,307

(22) Filed: Mar. 12, 2018

(65) Prior Publication Data

US 2018/0266816 A1  Sep. 20, 2018

(30) Foreign Application Priority Data

Mar. 15, 2017 (JP) ................... 2017-049604

(51) Int. Cl.
  *G01B 11/30* (2006.01)
  *G01B 11/02* (2006.01)

(52) U.S. Cl.
  CPC ............ *G01B 11/303* (2013.01); *G01B 11/02* (2013.01)

(58) Field of Classification Search
  CPC ..... G01B 11/30; G01B 11/2518; G01B 11/24; G01B 11/303; G01B 11/02;
  (Continued)

(56) References Cited

U.S. PATENT DOCUMENTS

| | | | | |
|---|---|---|---|---|
| 5,189,490 | A * | 2/1993 | Shetty | G01B 11/303 348/128 |
| 7,189,984 | B2 * | 3/2007 | Sawada | G01B 11/2518 250/559.07 |
| 2015/0077843 | A1 * | 3/2015 | Huhse | G02B 21/0032 359/380 |

FOREIGN PATENT DOCUMENTS

| | | |
|---|---|---|
| JP | 49-31345 | 3/1974 |
| JP | 63-37205 | 2/1988 |

(Continued)

OTHER PUBLICATIONS

Yasuhiro Takaya et al., "Measurement of Ultra-fine Random Surface Roughness Based on Fraunhofer Diffraction", The Japan Society for Precision Engineering, vol. 56, No. 2, pp. 139-146, 1990 (with English abstract).

(Continued)

*Primary Examiner* — Hoa Pham

(74) *Attorney, Agent, or Firm* — Wenderoth, Lind & Ponack, L.L.P.

(57) ABSTRACT

An on-machine measurement device comprises: a moving mechanism that makes scanning irradiation with a laser beam by moving a cutting target as a measurement target relative to a laser source; a half mirror that causes the beam from the laser source to enter the cutting target vertically; a lens that focuses the beam scattered, diffracted, and reflected on the cutting target; a projection plane for a focal image of the beam having passed through the lens; a light-receiving element array that converts an optical signal at the projection plane to an electrical signal and outputs an analog signal; and a calculator that stores received beam information in chronological order acquired by the light-receiving element array, converts the received beam information stored in chronological order to space information to generate an optical diffraction image, and acquires a beam intensity distribution based on the generated optical diffraction image.

4 Claims, 4 Drawing Sheets

(58) Field of Classification Search
CPC .. G01N 21/4788; G01N 21/47; G01N 21/956; G01N 2021/1772
USPC ....... 356/600–623, 237.1–237.5; 250/559.22
See application file for complete search history.

(56) References Cited

FOREIGN PATENT DOCUMENTS

| | | |
|---|---|---|
| JP | 1-193631 | 8/1989 |
| JP | 1-292202 | 11/1989 |
| JP | 2-61511 | 3/1990 |
| JP | 8-166214 | 6/1996 |
| JP | 8-505952 | 6/1996 |
| JP | 2012-137484 | 7/2012 |
| JP | 2013-29350 | 2/2013 |

OTHER PUBLICATIONS

Notification of Reasons for Refusal dated Aug. 7, 2018 in corresponding Japanese Application No. 2017-049604 (with partial English translation).

* cited by examiner

MEASUREMENT DEVICE

This application is based on and claims the benefit of priority from Japanese Patent Application No. 2017-049604, filed on 15 Mar. 2017, the content of which is incorporated herein by reference.

BACKGROUND OF THE INVENTION

Field of the Invention

The present invention relates to a measurement device that measures a target to be machined by a machine tool as a measurement target.

Related Art

There has been a technique conventionally known for measuring a surface profile by analyzing a reflected beam of a laser applied to a surface of a measurement target. Such a technique is disclosed by patent documents 1 to 3, for example. Patent document 1 describes a technique of measuring surface properties by using a scattered beam resulting from irradiation of a target to be machined by an NC machine tool with a laser beam. Patent document 2 describes a technique of acquiring surface information about a test target by acquiring a light intensity distribution using a reflected beam of an illuminating beam. Patent document 3 describes a technique of detecting a defect on a plane of the inner surface of a test target using a reflected beam.

Patent Document 1: Japanese Unexamined Patent Application, Publication No. H08-166214
Patent Document 2: Japanese Unexamined Patent Application, Publication No. 2013-29350
Patent Document 3: Japanese Unexamined Patent Application, Publication No. H01-1931

SUMMARY OF THE INVENTION

A measurement device for a machine tool to be used for work such as cutting has found difficultly in measuring a surface by directly observing the surface in an image. Hence, a measurement device to be used has been required to be capable of observing a surface of a target without being susceptible to influence by the physicochemical properties of a cutting fluid. Additionally, while it has been important to evaluate the smoothness of a fine structure on a surface of a measurement target, the conventional techniques have room for improvement in terms of precisely measuring the state of the surface entirely in a depth direction.

The present invention is intended to provide a structure to be employed in an on-machine measurement device for a machine tool and capable of measuring the shape of a surface fine structure of a measurement target precisely in a depth direction.

(1) The present invention relates to a measurement device (on-machine measurement device 1 described later, for example) that measures a target to be machined by a machine tool as a measurement target (cutting target 51 described later, for example), comprising: a laser source (laser source 20 described later, for example) that emits a laser beam; a moving mechanism (moving mechanism 30, feed axis 10 described later, for example) that makes scanning irradiation with the laser beam by moving the measurement target relative to the laser source; a half mirror (half mirror 31 described later, for example) that causes the beam from the laser source to enter the measurement target vertically; a lens (lens 32 described later, for example) that focuses the beam scattered, diffracted, and reflected on the measurement target; a projection plane (projection plane 33 described later, for example) for a focal image of the beam having passed through the lens; a light-receiving element unit (light-receiving element array 41 described later, for example) that converts an optical signal at the projection plane to an electrical signal and outputs an analog signal; an A/D converter (A/D converter array 42 described later, for example) that converts the analog signal from the light-receiving element unit to a digital signal; and a calculator (calculator 43 described later, for example) connected to the A/D converter, wherein the calculator stores received beam information in chronological order acquired by the light-receiving element unit through the scanning irradiation with the laser beam, converts the received beam information stored in chronological order to space information to generate an optical diffraction image, and acquires a beam intensity distribution based on the generated optical diffraction image.

(2) In the measurement device described in (1), the moving mechanism may allow the positions of the half mirror, the laser source, the lens, and the projection plane relative to each other so as to maintain a determined focal length.

(3) In the measurement device described in (1) or (2), the laser source may be capable of emitting a pulsed wave or a coherent continuous wave.

(4) In the measurement device described in any one of (1) to (3), the calculator may calculate the geometric dimensions and surface roughness of a fine structure based on the acquired beam intensity distribution.

The on-machine measurement device of the present invention is capable of measuring the shape of a surface fine structure of the measurement target precisely in a depth direction.

DETAILED DESCRIPTION OF THE INVENTION

Figure 1:
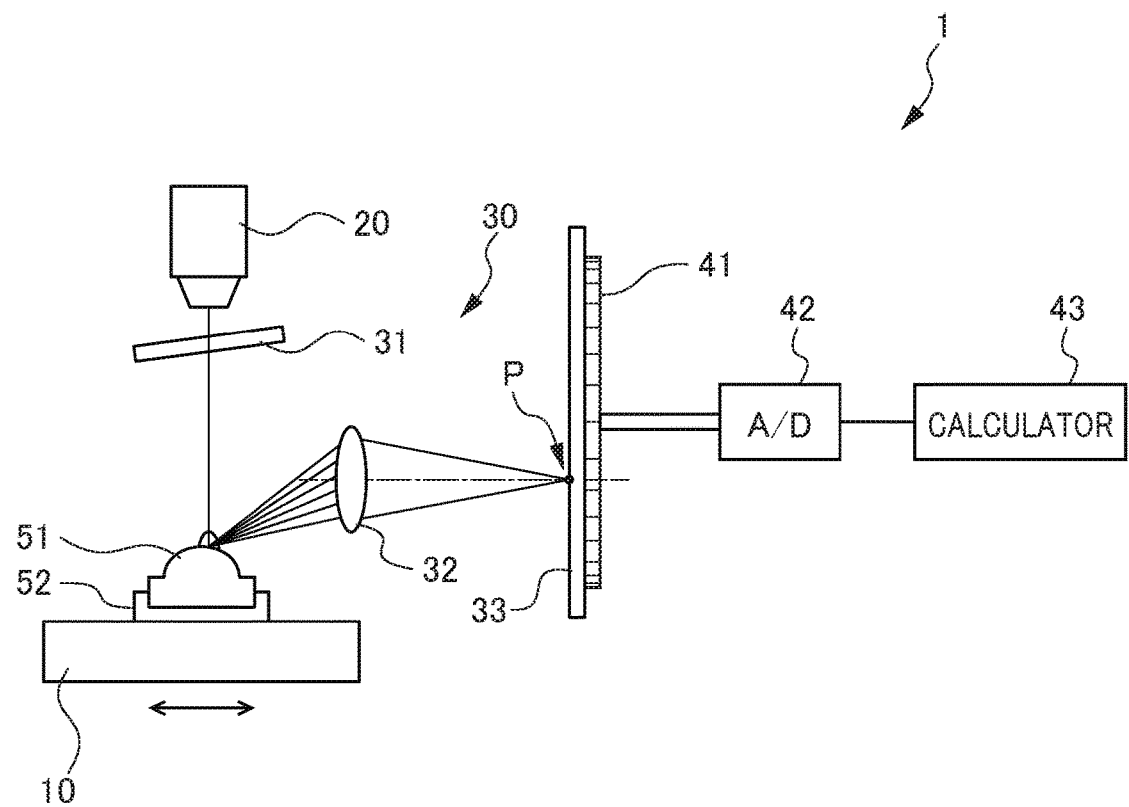
FIG. 1 schematically shows an on-machine measurement device according to an embodiment of the present invention.

A preferred embodiment of the present invention will be described below by referring to the drawings.

FIG. 1 schematically shows an on-machine measurement device 1 according to an embodiment of the present invention. The on-machine measurement device 1 shown in FIG. 1 is to be arranged in a numerically-controlled (NC) machine tool to be driven by a motor such as a servo motor. The on-machine measurement device 1 is to measure the dimensions of a fine structure on a metal working surface by means of optical effect finished with a cutting tool or a cutting grinder.

As shown in FIG. 1, the on-machine measurement device 1 of this embodiment includes a work table 52, a laser source 20, a half mirror 31, a lens 32, a projection plane 33, a moving mechanism 30, a light-receiving element array 41, an A/D converter array 42, and a calculator 43.

The work table 52 is a table on which a work as a target of measurement by the on-machine measurement device 1 is to be placed. In this embodiment, a cutting target 51 as a target of machining by the NC machine tool is placed on the work table 52.

The user source 20 is to emit a laser beam for measurement. A laser beam used in this embodiment is a visible beam (in a range from 300 to 800 nm, for example), and is usable for reflecting the level of a plane quality (uniformity of beam reflection on a surface) recognizable by visual inspection in a measurement result. While a laser beam is not limited to a visible beam, the laser beam is preferably in a wavelength band in which metal and a cutting fluid are not to be absorbed. A laser source to be used as the laser source 20 is capable of emitting a laser beam as a pulsed wave or a coherent continuous wave.

The half mirror 31 is an optical part for causing a beam to enter the cutting target 51 vertically. A laser beam from the laser source 20 passes through the half mirror 31 and then enters the cutting target 51. The half mirror 31 is adjustable in a rotation angle so as to cause the laser beam to enter the cutting target 51 vertically. This makes it possible to precisely measure unevenness of a fine structure on a surface of the cutting target 51 in a depth direction.

The lens 32 is a Fourier transform lens for focusing a beam scattered, diffracted, and reflected on the cutting target 51. The beam focused by the lens 32 is projected on the projection plane 33.

The projection plane 33 includes an array of microlenses (not shown in the drawings) corresponding to pixels in the light-receiving element array 41 and is configured to form an image on a light-receiving element through the microlens in the focal point P. In this embodiment, the calculator 43 described later generates an optical diffraction image based on received beam information projected on the projection plane 33 according to the Fraunhofer diffraction theory, and calculates a beam intensity distribution.

The moving mechanism 30 includes a feed axis 10 to be moved by the driving force of a servo motor (not shown in the drawings) of the machine tool. The feed axis 10 is configured to be capable of moving the cutting target 51 placed on the work table 52 by using the driving force of the servo motor and to be capable of adjusting the position of the cutting target 51.

The moving mechanism 30 of this embodiment includes a servo motor (driving mechanism) for adjusting the rotation angle of the half mirror 31 described later, the position of the lens 32, and the position of the projection plane 33. The moving mechanism 30 allows scanning irradiation of the cutting target 51 with a laser beam while maintaining a focal length determined in advance.

The moving mechanism 30 is configured to be capable of changing the rotation angle of the half mirror 31 in response to the speed of the cutting target 51 to be moved by the feed axis 10. The above-described servo motor for adjusting the rotation angle of the half mirror 31 has performance such that the rotation angle of the half mirror 31 is adjustable at a speed responsive to at least a speed determined by the position adjustment by the feed axis 10. This makes it possible to maintain vertical incidence of a laser beam on the cutting target 51 during scanning irradiation.

The light-receiving element array 41 is a light-receiving element unit that converts an optical signal at the projection plane 33 to an electrical signal, and transmits the electrical signal to the A/D converter array 42. The light-receiving element array 41 is formed of a CMOS array or a CCD image sensor, for example.

The A/D converter array 42 is an A/D converter that converts an analog signal output from the light-receiving element array 41 to a digital signal. The digital signal from the A/D converter array 42 is transmitted to the calculator 43.

The calculator 43 is a computer including a CPU, a storage, etc. The calculator 43 performs measurement processing for calculating dimensions and surface roughness of a fine structure on a surface of the cutting target 51 based on the digital signal received from the A/D converter array 42.

Figure 2:
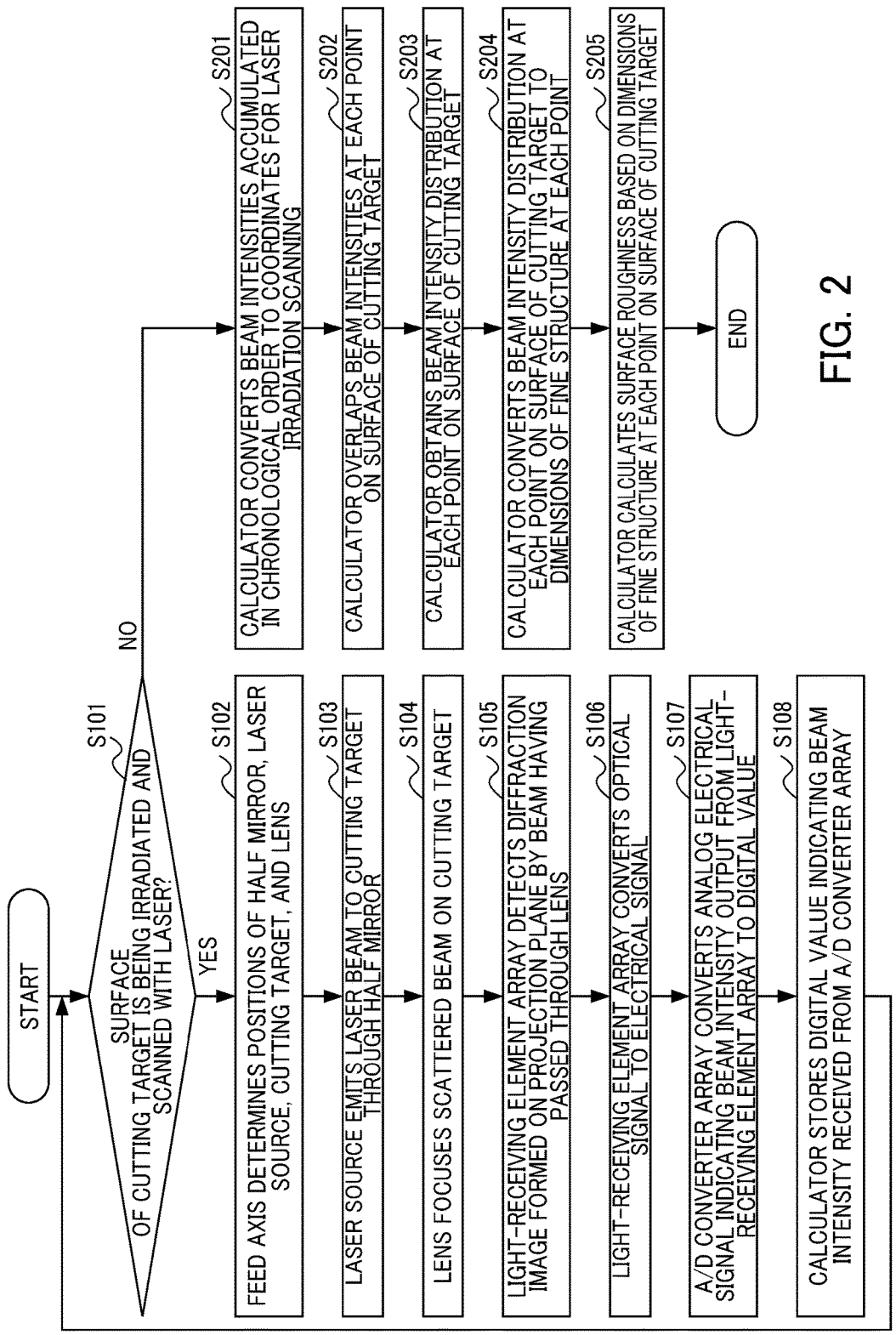
FIG. 2 a flowchart showing a flow of measurement processing by the on-machine measurement device according to this embodiment.

A flow of calculating the dimensions and surface roughness of a fine structure on a surface of the cutting target 51 followed by the on-machine measurement device 1 will be described next. FIG. 2 is a flowchart showing the flow of the measurement processing by the on-machine measurement device 1 according to this embodiment.

When the measurement processing is started, the surface of the cutting target 51 is irradiated with a laser. Then, it is determined whether or not the surface of the cutting target 51 is being irradiated and scanned with a laser (step S101). If a laser beam emitted from the laser source 20 is a pulsed wave, the irradiation scanning is done by repeating operation of irradiating a given point in an irradiation range determined in advance on the cutting target 51 with the pulsed wave, then moving the pulsed wave to a next point, and irradiating the next point with the pulsed wave. If a laser beam emitted from the laser source 20 is a coherent continuous wave, the irradiation scanning is done continuously so as to follow the shape of the cutting target 51.

If it is determined as a result of the process in step S101 that the laser irradiation scanning is being done, the respective positions of the half mirror 31, the laser source 20, the cutting target 51, and the lens 32 are determined by the feed axis 10 (step S102).

After these positions are determined in step S102, the laser source 20 emits a laser beam to the cutting target 51 through the half mirror 31 (step S103). A scattered beam on the cutting target 51 is focused by the lens 32. A diffraction image formed on the projection plane 33 by the beam having passed through the lens 32 is detected at the light-receiving element array 41 (step S104, step S105).

The light-receiving element array 41 converts an optical signal to an electrical signal, and transmits the electrical signal to the A/D converter array 42 (step S106, step S107). The calculator 43 stores beam intensity digital values in chronological order received from the A/D converter array 42 (step S108). After the process in step S108 is finished, the flow returns to step S101 and it is determined whether or not laser irradiation scanning is being done. If the scanning is being done, the flow from step S102 to step S108 is repeated.

If it is determined as a result of the determination process step S101 that the laser irradiation scanning is not being done, the flow goes to step S201 and subsequent steps. In step S201, the calculator 43 converts beam intensities accumulated in chronological order to coordinates for the laser irradiation scanning. Next, the calculator 43 overlaps beam intensities at each point on the surface of the cutting target 51 (step S202). In the overlapping process, a beam intensity at each point is calculated while beam intensities in an area shifted from the center of a laser beam irradiation range at the time of the overlapping process are taken into consideration (in chronological order) at each point. A beam intensity is calculated at each point in the entire area of the surface of the cutting target 51 to obtain a beam intensity distribution (step S203).

Figure 3:
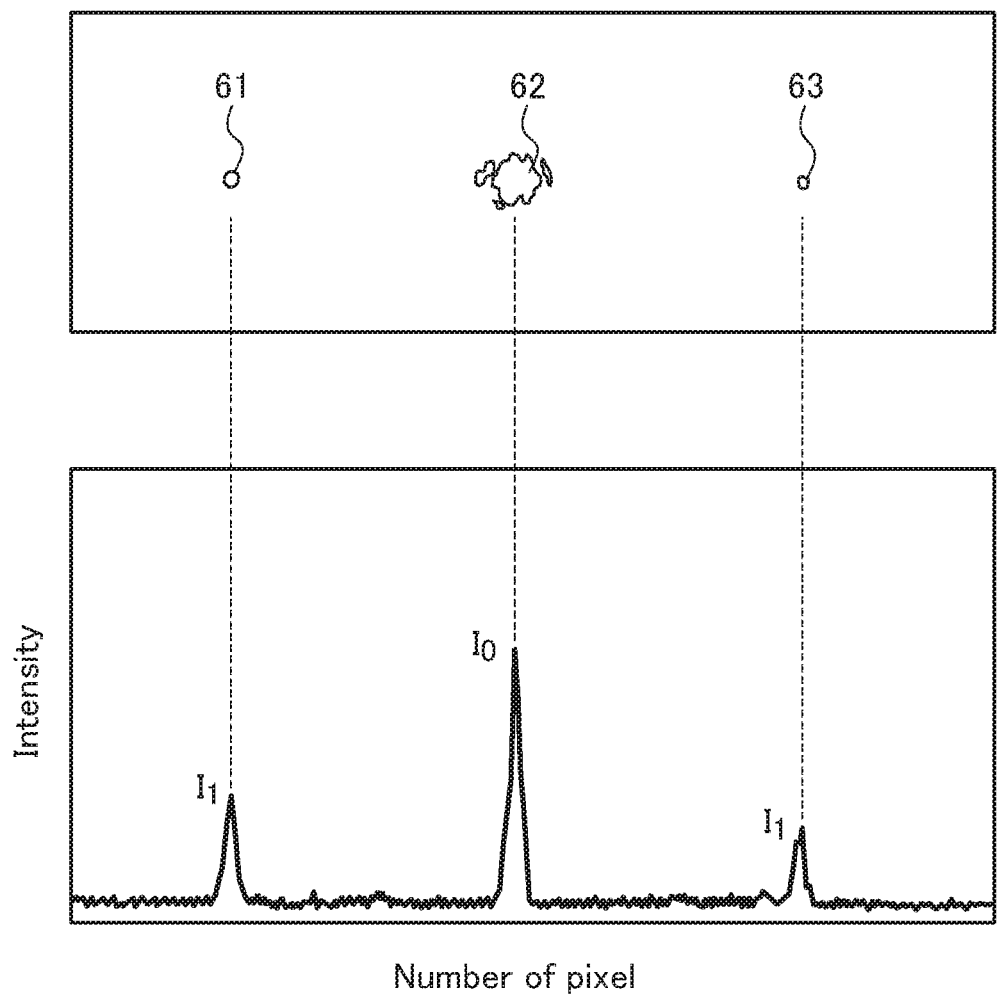
FIG. 3 is a graph showing an example of a diffraction pattern and an intensity distribution of a diffracted beam corresponding to the diffraction pattern.

After the process in step S203 is finished, the calculator 43 performs process of converting the beam intensity distribution at each point on the surface of the cutting target 51 to the dimensions of a fine structure at each point (step S204). An example of the conversion process to the fine structure using the beam intensity distribution will be described by referring to FIG. 3. FIG. 3 is a graph showing an example of a diffraction pattern and an intensity distribution of a diffracted beam corresponding to the diffraction pattern.

In the illustration of FIG. 3, an intensity distribution of a diffracted beam in the graph at the lower part of the plane of the drawing includes $I_1$, $I_0$, and $I_1$ of high diffracted beam intensities meaning positions in terms of pixel (number of pixel) that correspond to areas (fine structures) 61, 62, and 63 respectively in the diffraction pattern at the upper part of the plane of the drawing where surface roughness is large. The surface is flat in the other areas and a diffracted beam intensity is low in these areas. By calibrating a relationship between a beam intensity and a height in advance by taking advantage of this features, data about the beam intensity distribution can be converted easily to the dimensions of a fine structure.

Figure 4:
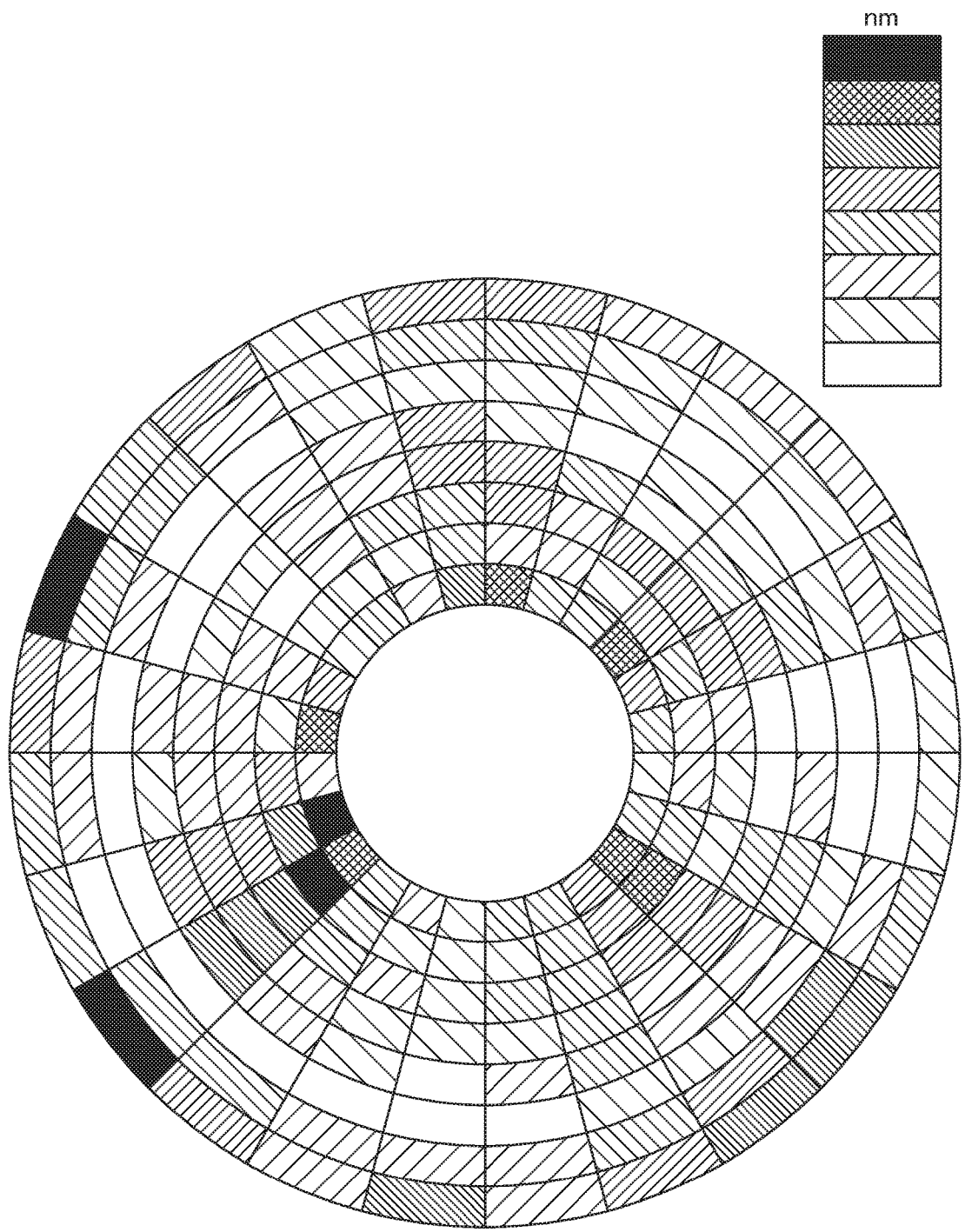
FIG. 4 is a surface roughness map schematically showing a distribution of surface roughness on a surface of a cutting target.

After the dimensions of the fine structure at each point on the surface of the cutting target 51 is acquired as a result of the process in step S204, surface roughness is calculated based on the acquired fine dimensions (step S205). An example of visualization of the surface roughness will be described by referring to FIG. 4. FIG. 4 is a surface roughness map schematically showing a distribution of surface roughness on the surface of the cutting target 51.

FIG. 4 shows surface roughness of each area of a disk-shaped member illustrated as an example of the cutting target 51. The depth of each area on a surface of a measurement target is shown differently by a hatching pattern on the order nanometers (nm). A bar in the upper part of the drawing shows the degree of surface roughness in stages. As shown in this map, the on-machine measurement device 1 of this embodiment allows visualization of the degree of unevenness of a fine structure on the surface of the measurement target. The above-described exemplary diffraction pattern and the map showing surface roughness resulting from conversion are merely given as examples. Various other methods for visualizing surface roughness are applicable.

The above-described embodiment achieves the following effects. The on-machine measurement device 1 includes: the laser source 20 that emits a laser beam; the moving mechanism 30 that makes scanning irradiation with the laser beam by moving the cutting target 51 relative to the laser source 20; the half mirror 31 that causes the beam from the laser source 20 to enter the cutting target 51 vertically; the lens 32 that focuses the beam scattered, diffracted, and reflected on the cutting target 51; the projection plane 33 for a focal image of the beam having passed through the lens 32; the light-receiving element array 41 that converts an optical signal at the projection plane 33 to an electrical signal and outputs an analog signal; the A/D converter array 42 that converts the analog signal from the light-receiving element array 41 to a digital signal; and the calculator 43 connected to the A/D converter array 42. The calculator 43 stores received beam information in chronological order acquired by the light-receiving element array 41 through the scanning irradiation with the laser beam, converts the received beam information stored in chronological order to space information to generate an optical diffraction image, and acquires a beam intensity distribution based on the generated optical diffraction image.

By the incidence of the laser beam to enter the surface of the cutting target 51 vertically, the optical diffraction image reflecting the depth direction of a fine structure is generated. Further, a plane quality indicating "an "appearance" recognized visually" can be quantified through the non-contact measurement based on the generated optical diffraction image, and the smoothness of the surface of the cutting target 51 can be evaluated precisely. This measurement is applicable even to a surface colored with a cutting fluid that cannot be measured directly by visual inspection or with a camera, for example, so that a surface state can be evaluated without causing influence by the general physicochemical properties of a cutting fluid on measurement.

In this embodiment, the moving mechanism 30 is configured to allow the positions of the half mirror 31, the laser source 20, the lens 32, and the projection plane 33 to be moved relative to each other so as to maintain a determined focal length.

Thus, beam intensity information can be acquired correctly at each point on the surface of the cutting target 51 entirely as a measurement target to achieve more precise measurement.

In this embodiment, the laser source 20 is configured to be capable of emitting a pulsed wave or a coherent continuous wave.

If a pulsed wave having an instantaneously high energy density is used, noise resulting from a scattered beam can be reduced. This makes it possible to acquire correct beam intensity information about each area of the surface of the cutting target 51. Using a coherent continuous wave allows application of an existing technique used in a 3D printer, for example, so that the device configuration can be designed easily.

In this embodiment, the calculator 43 calculates the geometric dimensions and surface roughness of a fine structure based on the acquired beam intensity distribution.

Thus, the plane quality of the fine structure on the surface of the cutting target 51 as a measurement target can be visualized correctly.

It should be noted that the present invention is not limited to the above-described preferred embodiment but the present invention can be changed, where appropriate. The shape of a measurement target is not limited to a planar shape but may be a curved shape.

EXPLANATION OF REFERENCE NUMERALS

1 On-machine measurement device (measurement device)
10 Feed axis
20 Laser source
30 Moving mechanism
31 Half mirror
32 Lens
33 Projection plane
41 Light-receiving element array (light-receiving element unit)
42 A/D converter array (A/D converter)
43 Calculator
51 Cutting target (measurement target)

What is claimed is:
1. A measurement device that measures a target to be machined by a machine tool as a measurement target, comprising:

a laser source that emits a laser beam;

a moving mechanism that makes scanning irradiation with the laser beam by moving the measurement target relative to the laser source;

a half mirror that causes the beam from the laser source to enter the measurement target vertically;

a lens that focuses the beam scattered, diffracted, and reflected on the measurement target;

a projection plane for a focal image of the beam having passed through the lens;

a light-receiving element unit that converts an optical signal at the projection plane to an electrical signal and outputs an analog signal;

an A/D converter that converts the analog signal from the light-receiving element unit to a digital signal; and a calculator connected to the A/D converter, wherein the calculator stores received beam information in chronological order acquired by the light-receiving element unit through the scanning irradiation with the laser beam, converts the received beam information stored in chronological order to space information to generate an optical diffraction image, and acquires a beam intensity distribution based on the generated optical diffraction image.

2. The measurement device according to claim 1, wherein the moving mechanism allows the positions of the half mirror, the laser source, the lens, and the projection plane relative to each other so as to maintain a determined focal length.

3. The measurement device according to claim 1, wherein the laser source is capable of emitting a pulsed wave or a coherent continuous wave.

4. The measurement device according to claim 1, wherein the calculator calculates the geometric dimensions and surface roughness of a fine structure based on the acquired beam intensity distribution.

* * * * *